United States Patent [19]

Reede

[11] Patent Number: 5,015,990

[45] Date of Patent: May 14, 1991

[54] BRAKE REPLACEMENT WARNING SYSTEM AND DEVICE USEFUL THEREIN

[76] Inventor: Dwayne Reede, 22 Jefferson St., Norwalk, Conn. 06851

[21] Appl. No.: 486,857

[22] Filed: Mar. 1, 1990

[51] Int. Cl.$^5$ .............................................. B60T 17/22
[52] U.S. Cl. ...................................... 340/454; 188/1.11
[58] Field of Search ............... 340/454, 453; 188/1.11; 192/30 V; 200/61.4, 61.44; 116/208

[56] References Cited

U.S. PATENT DOCUMENTS

| 2,814,684 | 11/1957 | De Pascale | 340/454 X |
| 3,689,880 | 9/1972 | McKee et al. | 340/454 |
| 3,735,343 | 5/1973 | Lane et al. | 340/454 |
| 3,805,228 | 4/1974 | Peeples | 340/454 |
| 3,914,734 | 10/1975 | Rigalt | 340/454 |
| 4,188,613 | 2/1980 | Yang et al. | 340/454 |
| 4,562,421 | 12/1985 | Duffy | 340/454 |
| 4,742,326 | 5/1988 | Gregoire et al. | 188/1.11 X |
| 4,869,350 | 9/1989 | Fargier et al. | 188/1.11 |

FOREIGN PATENT DOCUMENTS

2172945 10/1986 United Kingdom ................ 340/454

Primary Examiner—Joseph A. Orsino
Assistant Examiner—Brian R. Tumm
Attorney, Agent, or Firm—Handal & Morofsky

[57] ABSTRACT

A brake wear warning system includes detectors embedded in brake pads such that when a predetermined level of wear is reached, an alarm is activated alerting the vehicle driver that the brake pads are in need of replacement.

12 Claims, 7 Drawing Sheets

BRAKE REPLACEMENT WARNING SYSTEM AND DEVICE USEFUL THEREIN

TECHNICAL FIELD

The present invention relates in particular to brakes, disc or drum, and in general to apparatus in which one part is worn away in the course of use through frictional contact with a second part made of metal.

BACKGROUND

The importance of properly functioning brakes is increasingly apparent to virtually all vehicle drivers and passengers.

The speed at which people drive has been slowly increasing to where the average highway speed is seventy miles-per-hour in some states. There are more and more vehicles on the road resulting in crowding and unsafe distances between vehicles, i.e., tailgating. Larger loads are also being carried by the trucking industry and the use of tandem-trailers has been expanding. Additionally, public awareness is being focused upon the increasing problem of drugs and alcohol and the enormous impact of substance abuse upon accident and fatality figures.

Anti-lock and anti-skid braking systems are being touted by new car manufacturers and used as important selling features on new vehicles in advertising.

The listed factors above, among others, underscore the need for properly functioning and adequately responsive brakes. It is also apparent that normal braking situations are now more common, as are "panic" braking situations. The result of additional braking is accelerated brake wear.

People are driving more miles per year on the average and keeping their cars longer. When these trends are coupled with even normal brake wear, let alone accelerated wear, cars will require more frequent and-/or additional brake servicing in order to avoid failure. However, the owner or driver often needs reminders for checking brake condition and servicing if necessary.

The public awareness of the importance of good brakes and the changing conditions in which vehicles are operated have raised the average level of concern as to the adequacy of brakes in general. However, specific concern as to one's own brakes may be absent. Additionally, inspection of the brakes requires the removal of the wheel from the vehicle so that a visual examination may be performed.

Many people are unwilling or unable to perform the inspection or not skilled enough to know what to look for when the wheel is removed. Additionally, routine maintenance is often overlooked and there is a tendency to avoid "free" brake examinations for fear of being taken advantage of by unscrupulous dealers or franchises.

Many vehicle owners may rely on the dashboard light to indicate when brakes need replacement. However, this trouble light is present to monitor the hydraulic braking system through brake fluid pressure and does not monitor brake pad wear.

A squeal from the brakes may be a warning, or may indicate that the rivets holding the brakepad to its backing are contacting the rotor or drum which can cause scoring of the rotor or drum. Should the pad be totally worn out, the noise would be from the pad backing contacting the rotor or drum, which would cause considerable damage to the rotor or drum.

Accordingly, the unwary driver who has neglected routine maintenance inspections on his/her brakes often runs a risk of damage to the brake system, resulting in a very dangerous situation. Repairs or replacement of damaged parts is also expensive.

SUMMARY OF THE INVENTION

The invention is intended to provide a remedy. It solves the problem of how to monitor brake wear remotely without the need for visual inspection. Warning of excessive wear, requiring brakepad replacement, is given before damage or loss of braking occurs.

BRIEF DESCRIPTION OF THE DRAWINGS

One way of carrying out the invention is described in detail below with reference to drawings which illustrate only one specific embodiment of the invention and in which.

BEST MODE FOR CARRYING OUT THE INVENTION

Figure 1:
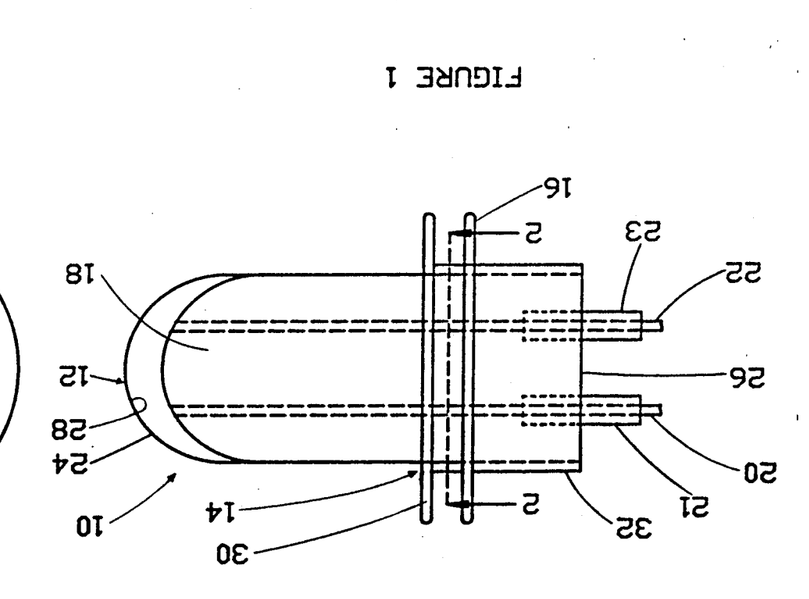
FIG. 1 is a schematic side view of a detector.
Figure 2:
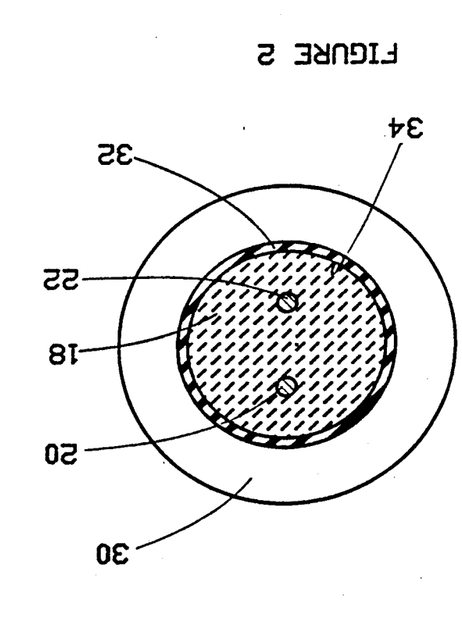
FIG. 2 is a sectional view of the detector of FIG. 1 along line 2—2.

Referring to FIG. 1, the structure of the inventive detector 10 is seen to comprise a body section 12, a cap 14 and a retainer 16. Body section 12 is comprised of a body material 18, two wires 20 and 22, wire insulation 21 and 23 and body coating 24. Body material 18 is here chosen from insulating, space polymer or thermoset materials such as an epoxy or a Bakelite-type plastic. Electric leads, embedded in body section 12, such as wires 20 and 22, are metal, preferably copper and either solid or stranded. Wires 20 and 22 protrude from the rear end 26 of body material 18, pass through body material 18 and are coterminal with front end 28 of the body material. Coating 24 covers front end 28 of body material 18 and the coterminal ends of wires 20 and 22. Body material 18 serves to isolate and insulate wires 20 and 22. Coating 24 may be the same insulating material as body material 18. Body material 18 serves to isolate and electrically insulate wires 20 and 22 from each other and outside contact over the length of the body section, as shown in FIG. 2.

Cap 14, comprising rim 30 and sleeve 32 fits snuggly over body section 12, leaving front end 28 and coating 24 exposed. An adhesive layer 34 may further secure the fixed position of the cap 14 upon body section 12.

Figure 4:
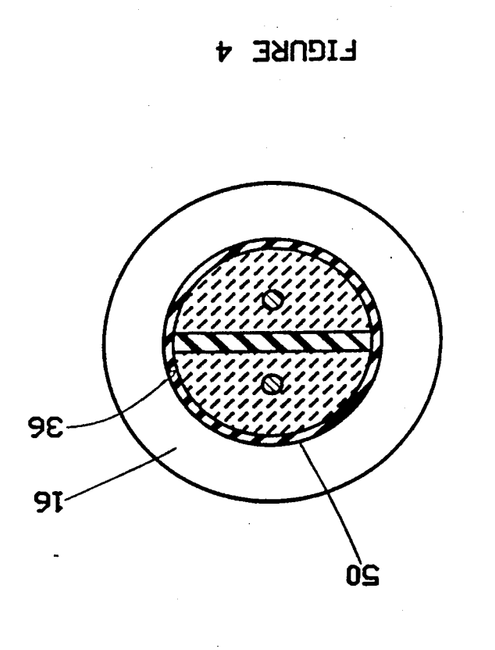
FIG. 4 is a sectional view of the detector of FIG. 3 along line 4—4.

Retainer 16 fits snugly over sleeve 32 and may be retained in place by friction or by glue 36 as shown in FIG. 4.

Figure 3:
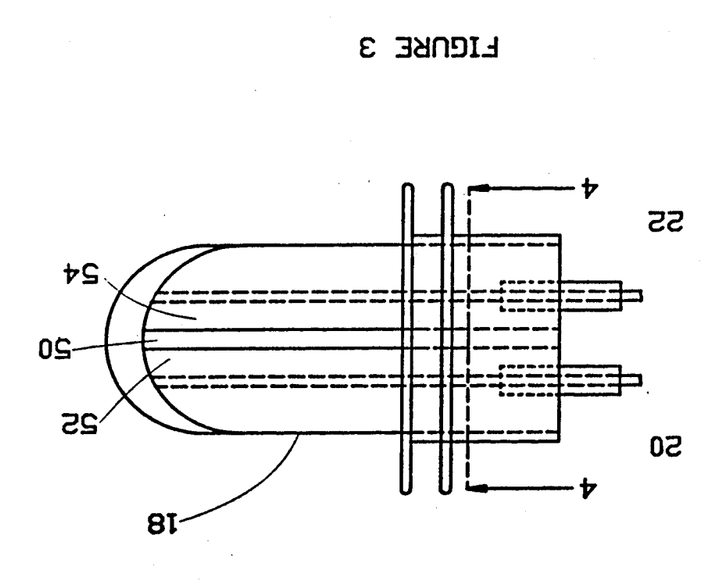
FIG. 3 is a schematic side view of a detector including an insulator strip.

An insulator slab 50 may bisect body material 18 into half-sections 52 and 54 containing wires 20 and 22, respectively. The presence of insulator slab 50 allows use of material such as graphite with metal flakes as body material while keeping wires 20 and 22 physically and electrically insulated from each other as illustrated in FIGS. 3 and 4.

Figure 5:
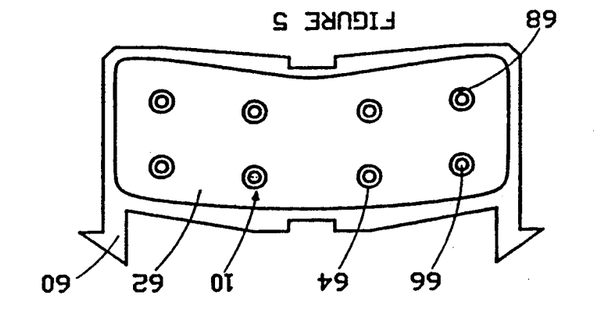
FIG. 5 is a plan view of a brake pad incorporating a detector.

A typical brake pad for disc brakes, illustrated in FIG. 5, comprises a backing 60 and a pad 62. Holes, such as 64, are provided in pad 62 and these holes align with holes, such as 66, in the backing 60 therefore allowing rivets, such as 68 to join pad 62 with backing 60. Adhesive is also used.

A detector 10, as described, may be fit into a pad hole. The backing hole, and associated rivet, may or may not require drilling to enlarge the backing hole to accept the detector and sleeve section 32 of the cap 14. Accordingly, conventional disc brake pads may be fitted with detectors.

Figure 6:
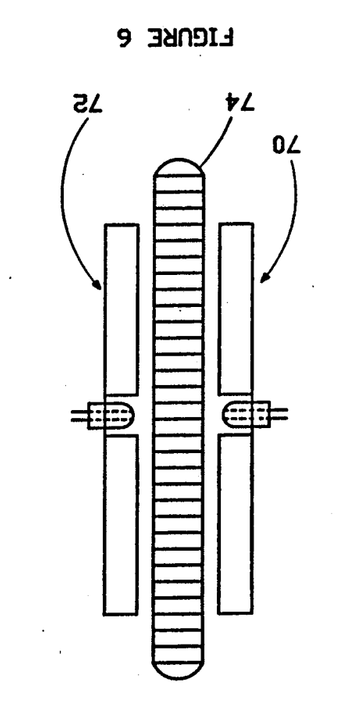
FIG. 6 is a schematic representation of detectors as used in a disc brake.

As illustrated in FIG. 6, both an inboard pad assembly 70 and an outboard pad assembly 72 may be fitted with detectors. The front end of each detector is oriented towards a rotor 74 against which pad assemblies 70 and 72 press in order to produce a braking effect.

Figure 7:
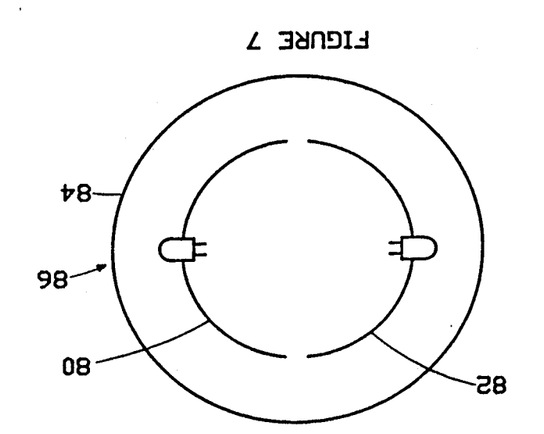
FIG. 7 is a schematic representation of detectors as used in a drum brake.

The devices may also be used by being fit into both a first shoe assembly 80 and a second shoe assembly 82 of a drum brake 86, shown schematically in FIG. 7. In the drum brake, the front end of each detector is oriented towards the brake drum 84. A hole must be bored through the pad and the backing to accommodate the device.

Figure 8:
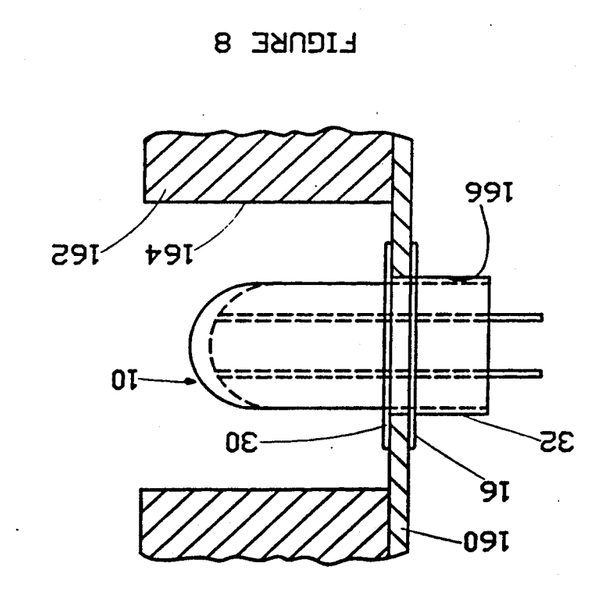
FIG. 8 is a partial sectional view of a detector in a brake pad.
Figure 9:
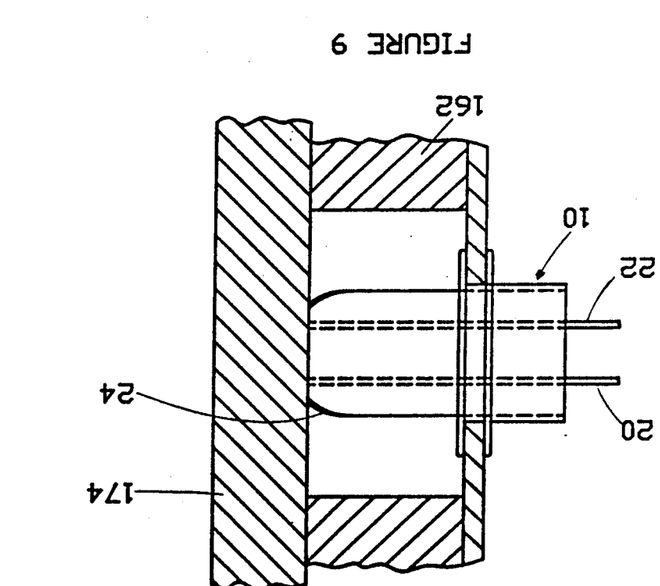
FIG. 9 is a partial sectional view of a detector in an activated state.

A hole 164 in pad 162 must be large enough to accommodate cap rim 30 of device 10. Similarly, hole 166, in backing 160, must be sufficiently large to allow passage of cap sleeve 32. Retainer 16 is affixed to device 10, holding device 10 in position, with cap rim 30 and retainer 16 cooperating to prevent movement of cap and associated body section 12 with respect to backing 160. FIG. 8 is illustrative of a device positioned in a brake pad assembly and FIG. 9 depicts a device in a pad assembly worn to a point where replacement would be prudent.

Brake pad 162 is worn away by the metal 174, be it a rotor or drum. The metal 174 that wears away the pad will contact device 10 when wear to the pad is sufficient. Metal 174 will contact both wires, 20 and 22, when coating 24 is sufficiently worn away to reveal wires 20 and 22. Metal 174 is conductive and therefore wires 20 and 22 are no longer electrically insulated and an electric current may flow from one wire to the other through metal 174.

A warning system, utilizing the device, employs the device as a switch. A circuit with a warning indicator will include at least one detector which will initially act as an open switch leaving the circuit inactive. When a brake pad containing a detector is sufficiently worn such that a metal rotor or drum may contact the electric leads, the switch is closed by the contact of the metal and the circuit is activated to warn the vehicle operator of the imminent danger.

Figure 10:
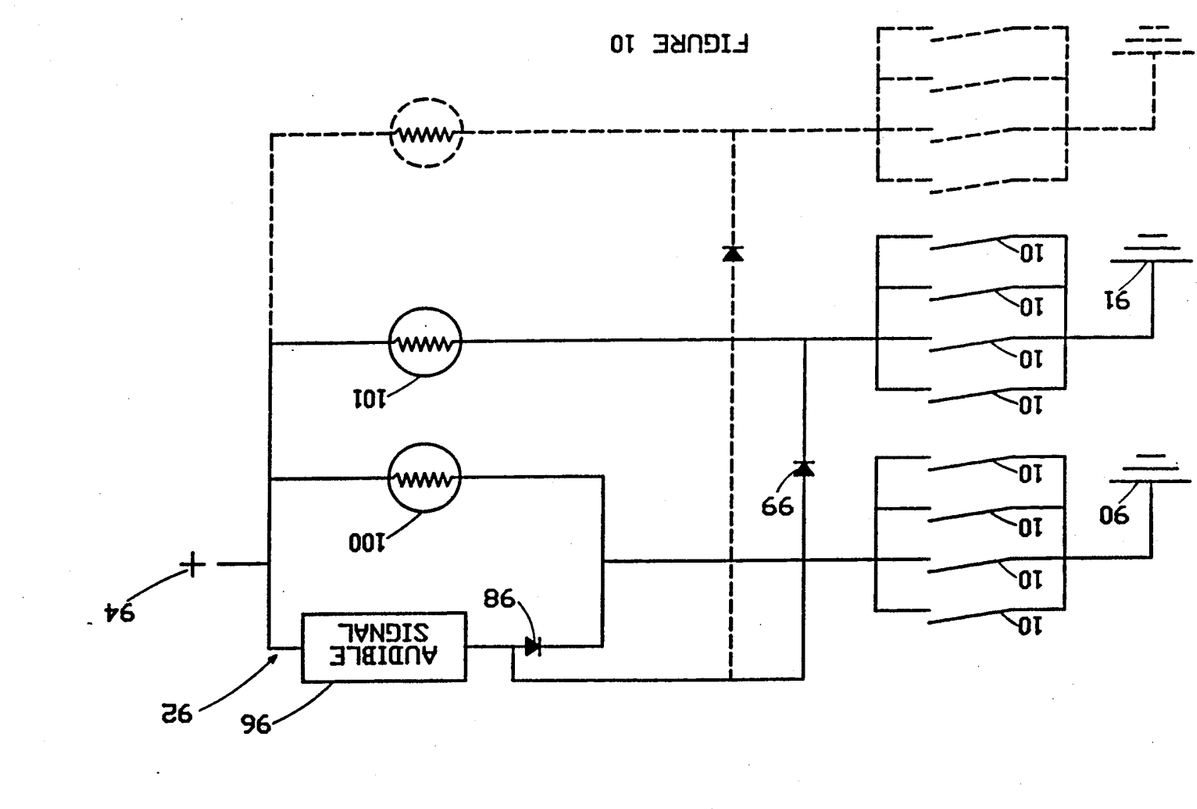
FIG. 10 is schematic circuitry diagram of a warning system using detectors.

It is preferred to have a detector in each pad of each brake and separate warning indicators for front and rear brakes. A preferred embodiment is schematically depicted in FIG. 10.

Four detectors 10, each mounted in a separate front wheel brake pad and connected in a parallel arrangement, are connected to ground 90 at one lead and connected through a warning indicator system 92 to a voltage source 94 at the other lead. Warning indicator system 92 in turn comprises an audible signal 96 such as a buzzer, bell or chime in series with a rectifier diode 98 and a visual signal such as lamp 100 in parallel arrangement with audible signal 96 and rectifier diode 98.

Four additional detectors 11 are each mounted in separate brake pad of the rear wheels. Detectors 11 are connected in parallel arrangement and are connected to ground 91 by one lead and through warning indicator system 92, via audible signal 96 rectifier diode 99 and lamp 101, to voltage source 94 by the other lead. Audible signal 96 and rectifier diode 99 are in series, while this series is in a parallel arrangement with lamp 101. Rectifier diodes 98 and 99 perform diode switching allowing the audible signal to activate for either a front or rear tire warning yet restricting current flow to only the appropriate indicator lamp. Additional circuitry may be added in the case of additional axles on a given vehicle, as shown in phantom lines.

Figure 11:
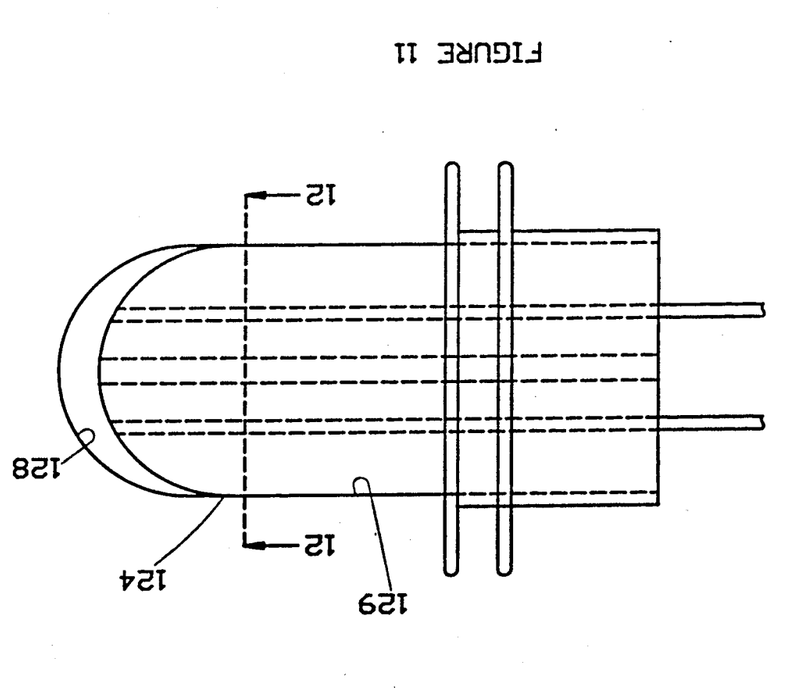
FIG. 11 is a schematic side view of a detector with slab electrodes.
Figure 12:
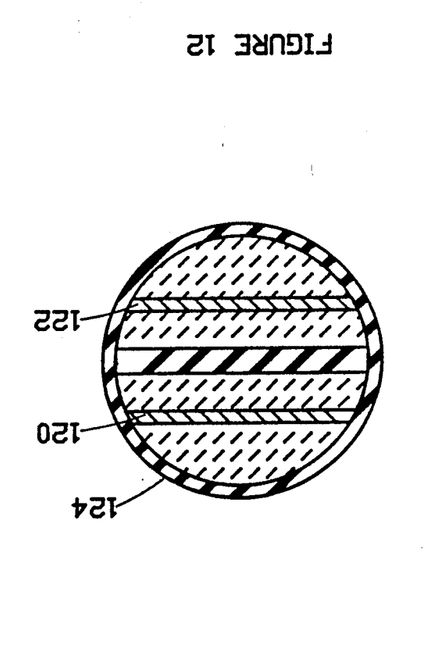
FIG. 12 is a sectional view of the detector of FIG. 11 along line 12—12.

Minor variations, as shown in FIGS. 11 and 12, may be obtained by replacing wires 20 and 22 with slab or plate electric leads 120 and 122. Coating 124 would cover both front end 128 and side wall 129.

Coatings 24 and 124 serve to avoid false warnings as may occur in the case of salty spray from roads, etc. contacting an uncoated detector and causing an electrical connection between electric leads.

In selecting material for body material 18, as well as other component parts of the detector, consideration must be taken of the heat generated by brakes and also the heat generated by direct frictional contact between body section 12 and metal brake part 174. Body material 18 should have wear resistance similar to but not greater than the pad material. Thus, the body material should abrade at least as easily as the pad material and should wear without melting, as melted material may coat the rotor or drum and insulate the electrodes from electrical contact with the rotor or drum. Body material 18 should be able to withstand temperatures in excess of 200° C., although normal operating temperatures are much less. Graphite and copper flakes, with or without a binder, in conjunction with an insulator slab 50 has been found effective.

Figure 13:
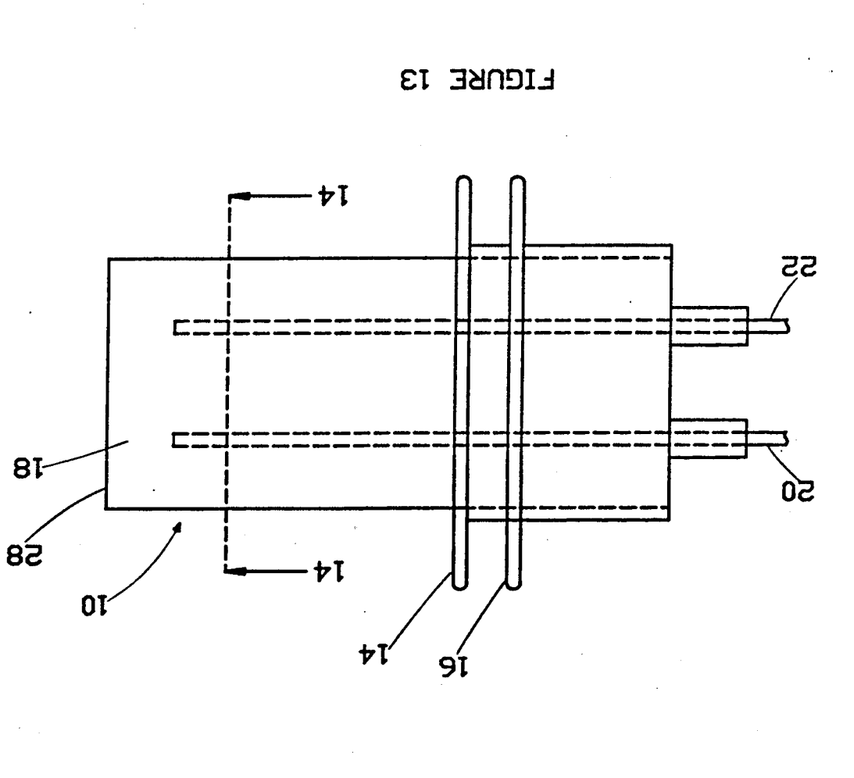
FIG. 13 is a schematic side view of a detector without a coating.
Figure 14:
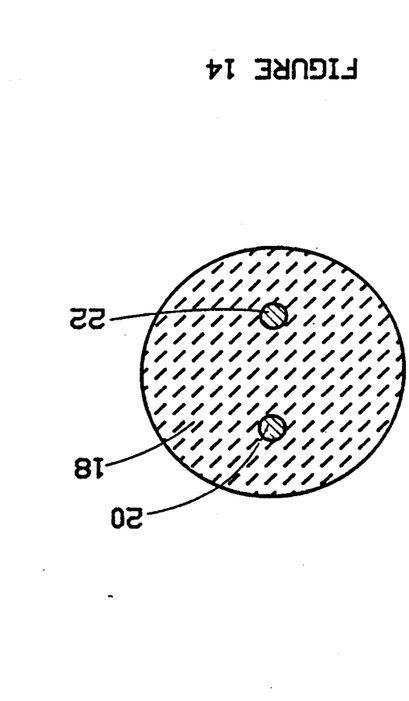
FIG. 14 is a sectional view of the detector of FIG. 13 along line 13—13.

The simplest detector, as illustrated in FIGS. 13 and 14 with a cap 14 and retainer 16, has leads 20 and 22 embedded in body material 18. The leads do not reach through the body material 18 to front end 28 and thus the front end 28 does not require an insulating coating.

Body material 18 surrounding wires 20 and 22 is electrically insulating and may be a plastic that is heat resistant throughout the operating temperature range, and above, and abrades at least as easily as the brake pad material to guarantee that the detector wears along with the brake pad.

While an illustrative embodiment of the invention has been described above, it is, of course, understood that various modifications will be apparent to those of ordinary skill in the art. Such modifications are within the spirit and scope of the invention, which is limited and defined only by the appended claims.

I claim:

1. A component wear warning system comprising a detector comprising:
   (a) two electric leads;
   (b) a body portion having two ends and at least one side, partially containing and physically and electrically insulating said two electric leads, one from another, such that said two electric leads enter one end of said body portion and said two electric leads are separate, exposed and coterminous with the other end of said body portion; and
   (c) a non-electrically-conducting coating, covering said other end of said body portion and the exposed electric leads.

2. A component wear warning system as claimed in claim 1, further comprising insulating material disposed around each of said two electric leads outside of said body portion where said two electric leads enter said one end of said body portion.

3. A component wear warning system as claimed in claim 1, further comprising an insulator dividing said body portion into two sections, each one of said two sections containing one of said two electric leads.

4. A component wear warning system as claimed in claim 3, wherein each of said two sections containing said electric leads comprises graphite and metal flakes.

5. A component wear warning system as claimed in claim 4, wherein said metal flakes are copper flakes.

6. A component wear warning system as claimed in claim 1, further comprising a cap having a rim and a sleeve disposed around said body portion and secured in place.

7. A component wear warning system as claimed in claim 6, further comprising a retainer disposed around said sleeve of said cap.

8. A component wear warning system as claimed in claim 1, further comprising a voltage source and a ground, each connected to one of said two electric leads and a warning signal between said voltage source and said detector.

9. A component wear warning system as claimed in claim 1, wherein said non-electrically-conducting coating is of the same material as said body portion.

10. A component wear warning system as claimed in claim 1, wherein each of said body portions comprise fragments of an abrasive material.

11. A brake wear warning system for a vehicle comprising:
    (a) a brakepad to be monitored:
    (b) a wear detection means having two separate leads insulated from each other, said two separate leads being situated in said brake pad;
    (c) a ground connected to one of said two leads;
    (d) a voltage source connected to the other of said two leads;
    (e) an audible signal device between said detection means and said voltage source;
    (f) a signal lamp between said detection means and said voltage source, said signal lamp being in a parallel arrangement with said audible signal device;
    (g) a rectifier diode arranged in series with said audible signal device and in parallel with said signal lamp;
    (h) further wear detection means, one for each brake pad on an additional axle, all of the first and further wear detection means arranged in parallel, each of said further wear detection means having two separate leads;
    (i) a ground connection on one of said two leads for each of said further wear detection means from the parallel arrangement of said further wear detection means, the other of said two leads for each of said further wear detection means connected to said voltage source;
    (j) a further signal lamp between said voltage source and said further wear detection means, and
    (k) a further rectifier diode with one further rectifier diode lead connected between said audible signal device and said rectifier diode, and the other further rectifier diode lead connected to said other of said two leads of the further wear detection means such that said further rectifier diode and said audible signal device are in a parallel arrangement with said further signal lamp and wherein said rectifier diode and said further rectifier diode are oriented such that current can only flow away from said audible signal device.

12. A component wear warning system comprising:
    (a) a component that is to be monitored for wear;
    (b) a detector body section having two ends and a middle portion between said ends, said body section comprising an electrically non-conducting and heat resistant material that abrades at least as easily as said component; and
    (c) two electric leads, said leads entering one of said two ends of said body section and each of said two electric leads ending within said body section at a predetermined distance from the other of said two ends, said predetermined distance from the other of said two ends being the same for each of said two electric leads, said two electric leads being electrically insulated from each other.

* * * * *